Figure 1:
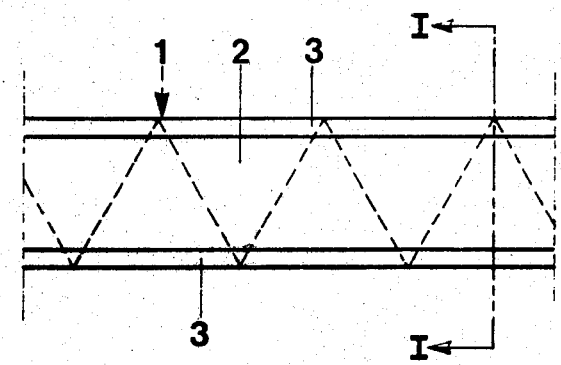

United States Patent [19]

Laurin

[11] 3,990,329
[45] Nov. 9, 1976

[54] METHOD OF MAKING CUTTING TOOLS
[75] Inventor: Leif Laurin, Partille, Sweden
[73] Assignee: SKF Industrial Trading and Development Company B.V., Jutphaas, Netherlands
[22] Filed: Dec. 30, 1974
[21] Appl. No.: 537,114

[30] Foreign Application Priority Data
Jan. 30, 1974 Sweden.............................. 7401159

[52] U.S. Cl............................... 76/101 R; 29/417; 76/101 A
[51] Int. Cl.²........................................... B21K 5/12
[58] Field of Search...................... 76/101 R, 101 A; 29/412, 417

[56] References Cited
UNITED STATES PATENTS
| | | | |
|---|---|---|---|
| 1,645,895 | 10/1927 | Coenen.......................... | 76/101 R X |
| 1,942,025 | 1/1934 | Frost................................. | 29/417 |
| 2,275,021 | 3/1942 | Somes.............................. | 76/101 A |
| 2,418,320 | 4/1947 | Simmons.......................... | 76/101 A |
| 3,137,934 | 6/1964 | Rhoads............................. | 29/417 |

*Primary Examiner*—Al Lawrence Smith
*Assistant Examiner*—Nicholas P. Godici
*Attorney, Agent, or Firm*—Daniel M. Rosen

[57] ABSTRACT

Method of making cutting tool bits of the indexable insert type with a plurality of cutting edges, characterized by that a bandshaped body, which along at least one of its edges is provided with a portion consisting of a material suitable for carrying out operations, the material being different from the material of the rest of the band, is divided into a number of polygonal bodies constituting cutting tool blanks, the dividing operation being carried out in such a way that at least two corners on each blank are situated in the material which is suitable for carrying out cutting operations, the cutting edges being formed in these corners.

6 Claims, 3 Drawing Figures

U.S. Patent     Nov. 9, 1976     3,990,329

METHOD OF MAKING CUTTING TOOLS

The present invention relates to a method of making cutting tool bits of the indexable insert type with a plurality of cutting edges. Such tools are commonly known, and their purpose is to provide for a decreasing tool cost compared to the cost of using conventional tools, i.e. tools with only one cutting edge. Since an indexable insert tool bit has more cutting edges than a conventional tool, the tool cost when using indexable insert tool bits is comparatively less because the tool can be used a longer time without having to be resharpened. However, when using indexable insert tool bits, the tool cost is considerable because of the comparatively high price of these tool bits.

It is therefore the object of the present invention to provide a tool bit with a plurality of edges in such a way that the material consumption is kept low, the production procedure is simple, with the result that cutting tools can be produced at a very low cost.

Figure 1A:
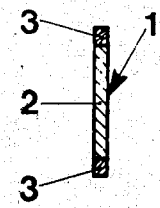
Figure 2:
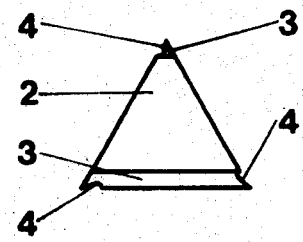

The foregoing object is achieved in accordance with the features of the invention described in the following more detailed specification and appended claims, later in conjunction with the drawings wherein:

FIGS. 1 and 1A show, in section, the principle of the structure of the starting material, and FIG. 2 shows a finished tool bit made according to one embodiment of the invention.

As will appear from FIG. 1, the starting material consists of a band-shaped body 1, comprising an interior layer 2 which can consist mainly of a low grade and therefore relatively inexpensive steel material. Along the edges of the body, which are suitably parallel and on the layer 2, this steel material is provided with strip portions 3 consisting of a material which is suitable for carrying out cutting operations. High grade tool steels or materials on a carbide basis are examples of such suitable materials. Depending on e.g. the properties of the respective materials and the size and shape of the strip portions 3, different joining methods can be used for joining the materials of the interior layer 2 and strip portions 3 that are disposed at the different surfaces of the layer 2. A number of suitable methods are known per se, e.g. bimetal welding methods or so called spray-coating methods. The band-shaped body, comprising the starting material, according to the invention, is divided into a number of polygonal bodies in order to achieve a number of cutting tool blanks, the dividing being carried out in such a way that at least two corners in each blank are situated in a strip portion 3 containing the material which is suitable for carrying out cutting operations. In FIG. 1 the sketched dashed lines indicate how the band can suitably be divided, e.g. in a number of congruent equiangular triangles, the corners of which being situated in the strip portions 3. The dividing of the band can be made in different ways, which are known per se, e.g. by shearing or cutting.

FIG. 2 shows a cutting tool in the shape of a triangle produced as above, the cutting edges 4 having been given a shape which makes the tool suitable for using as a parting tool. The shape of the cutting edges can be produced after dividing of the band 1 into a number of tool blanks, but it is also possible to give the corners of the blanks a suitable shape in connection with the dividing operation, so that the edges need only be finished after the making of the blanks.

It is often desirable to give the tools a shape such that they can easily be fitted to a tool holder. Therewith it is comparatively easy to give the desired shape to the soft material of the interior layer 2 in each blank. This can possibly take place in connection with the operation of dividing the band 1.

As appears above, cutting tools can be made according to the invention with an extremely small consumption of expensive cutting tool material, and the tool blanks can easily be given the desired shape. The shape shown in the figures is only an example of a suitable shape. As an example of other possible shapes, it can be mentioned that the band 1 can be cut off perpendicularly to its longitudinal direction, whereby a number of rectangular, preferably square, tool blanks are produced, making it possible to make four cutting edges on each tool. It is of course not necessary that both edges of the starting material, i.e. the band 1 (FIG. 1), consist of material suitable for carrying out cutting operations (i.e. both strip portions 3 are not necessary), but it is possible to make more cutting edges on each cutting tool bit if this is the case, which of course is favorable. If so desired, the band 1 can also be divided so that one or more of the edges of the cutting tool blank are curved.

I claim:

1. A method of producing cutting tool bits that are of the indexable insert type having a plurality of cutting edges, comprising the steps of providing a composite substantially flat strip of tool stock comprising a strip support component including two first and second oppositely disposed surfaces, joining first and second cutting edge strip components at said first and second respective opposite surfaces of said strip support component, said cutting edge components consisting essentially of a material suitable for a cutting operation and which is heterogeneous with respect to the material of said first support strip, dividing said tool stock strip into a plurality of polygonal shaped cutting tool blanks, each said tool blank having at least two corners formed thereon, said two corners located in said cutting edge strip material, and forming cutting edges at said corners.

2. A method as recited in claim 1, wherein said blanks are formed substantially as rectangles.

3. A method as recited in claim 1, wherein said cutting edges are at least partly formed simultaneously during said dividing step.

4. A method as recited in claim 1, wherein said dividing step comprises a shearing process and a cutting process.

5. A method as recited in claim 1, wherein said material of said first strip support component is softer than said cutting edge component material.

6. A method of producing cutting tool bits that are of the indexable insert type having a plurality of cutting edges, comprising the steps of providing a composite substantially flat strip of tool stock comprising a first strip support component and at least one cutting edge strip component secured at a surface of said first component, said cutting edge component consisting essentially of a material suitable for a cutting operation and which is heterogeneous with respect to the material of said first support strip, dividing said tool stock strip into a plurality of polygonal shaped cutting tool blanks, each having at least two corners formed on said tool blank and which are located in said cutting edge strip material, and forming cutting edges at said corners, said dividing operation being carried out for providing tool blanks which are generally triangular in shape and which have one side of a blank and a corner opposite said one side formed of said cutting edge strip material.

* * * * *